United States Patent
Feaver et al.

(10) Patent No.: US 10,490,358 B2
(45) Date of Patent: Nov. 26, 2019

(54) FLOW ULTRACAPACITOR (71) Applicant: BASF SE, Ludwigshafen (DE)

(72) Inventors: Aaron M. Feaver, Seattle, WA (US); Richard D. Varjian, Redmond, WA (US); Chad Goodwin, Seattle, WA (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/796,699

(22) Filed: Oct. 27, 2017

(65) Prior Publication Data

US 2018/0130609 A1 May 10, 2018

Related U.S. Application Data

(63) Continuation of application No. 13/448,197, filed on Apr. 16, 2012, now abandoned.

(60) Provisional application No. 61/476,136, filed on Apr. 15, 2011.

(51) Int. Cl.
| | |
|---|---|
| *H01G 9/145* | (2006.01) |
| *H01G 9/042* | (2006.01) |
| *H01G 9/00* | (2006.01) |
| *H01G 11/30* | (2013.01) |
| *H01G 11/58* | (2013.01) |

(52) U.S. Cl.
CPC .............. *H01G 9/145* (2013.01); *H01G 9/042* (2013.01); *H01G 9/155* (2013.01); *H01G 11/30* (2013.01); *H01G 11/58* (2013.01); *Y02E 60/13* (2013.01)

(58) Field of Classification Search
CPC ........ H01G 9/042; H01G 9/145; H01G 11/30; H01G 11/58; H01G 9/155

USPC ......................................................... 361/502
See application file for complete search history.

(56) References Cited

U.S. PATENT DOCUMENTS

| | | | |
|---|---|---|---|
| 3,518,123 A | 6/1970 | Katsoulis et al. |
| 3,619,428 A | 11/1971 | David |
| 3,876,505 A | 4/1975 | Stoneburner |
| 3,977,901 A | 8/1976 | Buzzelli |
| 4,082,694 A | 4/1978 | Wennerberg et al. |
| 4,159,913 A | 7/1979 | Birchall et al. |
| 4,198,382 A | 4/1980 | Matsui |
| 4,543,341 A | 9/1985 | Barringer et al. |
| 4,580,404 A | 4/1986 | Pez et al. |

(Continued)

FOREIGN PATENT DOCUMENTS

| | | |
|---|---|---|
| CA | 2176452 A1 | 11/1997 |
| CN | 1554102 A | 12/2004 |

(Continued)

OTHER PUBLICATIONS

Abraham et al., "A Polymer Electrolyte-Based Rechargeable Lithium/Oxygen Battery," *J. Electrochem. Soc. 143*(1):1-5, Jan. 1996.

(Continued)

*Primary Examiner* — Michael P McFadden
(74) *Attorney, Agent, or Firm* — Seed Intellectual Property Law Group LLP (57) ABSTRACT

The present application is generally directed towards electrochemical energy storage devices. The devices comprise electrode material suspended in an appropriate electrolyte. Such devices are capable of achieving economical $/kWh (cycle) values and will enable much higher power and cycle life than currently used devices.

18 Claims, 3 Drawing Sheets

(56) References Cited

U.S. PATENT DOCUMENTS

| | | |
|---|---|---|
| 4,769,197 A | 9/1988 | Kromrey |
| 4,843,015 A | 6/1989 | Grubbs, Jr. et al. |
| 4,862,328 A | 8/1989 | Morimoto et al. |
| 4,873,218 A | 10/1989 | Pekala |
| 4,954,469 A | 9/1990 | Robinson |
| 4,997,804 A | 3/1991 | Pekala |
| 4,999,330 A | 3/1991 | Bose et al. |
| 5,061,416 A | 10/1991 | Willkens et al. |
| 5,093,216 A | 3/1992 | Azuma et al. |
| 5,260,855 A | 11/1993 | Kaschmitter et al. |
| 5,294,498 A | 3/1994 | Omaru et al. |
| 5,416,056 A | 5/1995 | Baker |
| 5,420,168 A | 5/1995 | Mayer et al. |
| 5,465,603 A | 11/1995 | Anthony et al. |
| 5,508,341 A | 4/1996 | Mayer et al. |
| 5,529,971 A | 6/1996 | Kaschmitter et al. |
| 5,614,460 A | 3/1997 | Schwarz et al. |
| 5,626,637 A | 5/1997 | Baker |
| 5,626,977 A | 5/1997 | Mayer et al. |
| 5,670,571 A | 9/1997 | Gabrielson et al. |
| 5,674,642 A | 10/1997 | Le et al. |
| 5,710,092 A | 1/1998 | Baker |
| 5,726,118 A | 3/1998 | Ivey et al. |
| 5,744,258 A | 4/1998 | Bai et al. |
| 5,789,338 A | 8/1998 | Kaschmitter et al. |
| 5,834,138 A | 11/1998 | Yamada et al. |
| 5,858,486 A | 1/1999 | Metter et al. |
| 5,882,621 A | 3/1999 | Doddapaneni et al. |
| 5,891,822 A | 4/1999 | Oyama et al. |
| 5,908,896 A | 6/1999 | Mayer et al. |
| 5,945,084 A | 8/1999 | Droege |
| 5,965,483 A | 10/1999 | Baker et al. |
| 6,006,797 A | 12/1999 | Bülow et al. |
| 6,064,560 A | 5/2000 | Hirahara et al. |
| 6,069,107 A | 5/2000 | Kuznetsov et al. |
| 6,072,693 A | 6/2000 | Tsushima et al. |
| 6,096,456 A | 8/2000 | Takeuchi et al. |
| 6,117,585 A | 9/2000 | Anani et al. |
| 6,147,213 A | 11/2000 | Poli et al. |
| 6,153,562 A | 11/2000 | Villar et al. |
| 6,205,016 B1 | 3/2001 | Niu |
| 6,225,257 B1 | 5/2001 | Putyera et al. |
| 6,242,127 B1 | 6/2001 | Paik et al. |
| 6,309,446 B1 | 10/2001 | Nakanoya et al. |
| 6,310,762 B1 | 10/2001 | Okamura et al. |
| 6,339,528 B1 | 1/2002 | Lee et al. |
| 6,509,119 B1 | 1/2003 | Kobayashi et al. |
| 6,574,092 B2 | 6/2003 | Sato et al. |
| 6,592,838 B1 | 7/2003 | Nomoto et al. |
| 6,697,249 B2 | 2/2004 | Maletin et al. |
| 6,764,667 B1 | 7/2004 | Steiner, III |
| 6,815,105 B2 | 11/2004 | Cooper et al. |
| 6,865,068 B1 | 3/2005 | Murakami et al. |
| 7,245,478 B2 | 7/2007 | Zhong et al. |
| 7,419,649 B2 | 9/2008 | Lundquist et al. |
| 7,582,902 B2 | 9/2009 | Tano et al. |
| 7,626,804 B2 | 12/2009 | Yoshio et al. |
| 7,722,991 B2 | 5/2010 | Zhang et al. |
| 7,723,262 B2 | 5/2010 | Feaver et al. |
| 7,754,178 B2 | 7/2010 | Tano et al. |
| 7,785,495 B2 | 8/2010 | Kikuchi et al. |
| 7,816,413 B2 | 10/2010 | Feaver et al. |
| 7,835,136 B2 | 11/2010 | Feaver et al. |
| 8,158,556 B2 | 4/2012 | Feaver et al. |
| 8,277,974 B2 | 10/2012 | Kumar et al. |
| 8,293,818 B2 | 10/2012 | Costantino et al. |
| 8,329,252 B2 | 12/2012 | Markavov et al. |
| 8,361,659 B2 | 1/2013 | Richard |
| 8,404,384 B2 | 3/2013 | Feaver et al. |
| 8,411,415 B2 | 4/2013 | Yoshinaga et al. |
| 8,467,170 B2 | 6/2013 | Feaver et al. |
| 8,480,930 B2 | 7/2013 | Suh et al. |
| 8,482,900 B2 | 7/2013 | Gadkaree et al. |
| 8,580,870 B2 | 11/2013 | Costantino et al. |
| 8,654,507 B2 | 2/2014 | Costantino et al. |
| 8,691,177 B2 | 4/2014 | Pfeifer et al. |
| 8,709,971 B2 | 4/2014 | Feaver et al. |
| 8,797,717 B2 | 8/2014 | Feaver et al. |
| 8,906,978 B2 | 12/2014 | Costantino et al. |
| 8,916,296 B2 | 12/2014 | Feaver et al. |
| 8,999,202 B2 | 4/2015 | Mulik et al. |
| 9,067,848 B2 | 6/2015 | Stadie et al. |
| 9,112,230 B2 | 8/2015 | Feaver et al. |
| 9,133,295 B2 | 9/2015 | Qureshi et al. |
| 9,133,337 B2 | 9/2015 | Ludvik et al. |
| 9,136,064 B2 | 9/2015 | Gadkaree et al. |
| 9,186,174 B2 | 11/2015 | Krishnan |
| 9,269,502 B2 | 2/2016 | Chang et al. |
| 9,287,556 B2 | 3/2016 | Neumann et al. |
| 9,409,777 B2 | 8/2016 | Geramita et al. |
| 9,412,523 B2 | 8/2016 | Costantino et al. |
| 9,464,162 B2 | 10/2016 | Kron et al. |
| 9,580,321 B2 | 2/2017 | Feaver et al. |
| 9,680,159 B2 | 6/2017 | Feaver et al. |
| 9,714,172 B2 | 7/2017 | Geramita et al. |
| 9,985,289 B2 | 5/2018 | Costantino et al. |
| 10,141,122 B2 | 11/2018 | Feaver et al. |
| 10,147,950 B2 | 12/2018 | Sakshaug et al. |
| 10,287,170 B2 | 5/2019 | Feaver et al. |
| 2001/0002086 A1 | 5/2001 | Webb |
| 2002/0031706 A1 | 3/2002 | Dasgupta et al. |
| 2002/0031710 A1 | 3/2002 | Kezuka et al. |
| 2002/0036885 A1 | 3/2002 | Lee et al. |
| 2002/0104474 A1 | 8/2002 | Wakamatsu et al. |
| 2002/0114126 A1 | 8/2002 | Hirahara et al. |
| 2002/0122985 A1 | 9/2002 | Sato et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0013606 A1 | 1/2003 | Hampden-Smith et al. |
| 2003/0064564 A1 | 4/2003 | Lin |
| 2003/0064565 A1 | 4/2003 | Maletin et al. |
| 2003/0108785 A1 | 6/2003 | Wu et al. |
| 2003/0170548 A1 | 9/2003 | Otsuki et al. |
| 2004/0106040 A1 | 6/2004 | Fukuoka et al. |
| 2004/0132845 A1 | 7/2004 | Rhine et al. |
| 2004/0141963 A1 | 7/2004 | Umekawa |
| 2004/0180264 A1 | 9/2004 | Honbo et al. |
| 2004/0241237 A1 | 12/2004 | Pirard et al. |
| 2004/0248730 A1 | 12/2004 | Kim et al. |
| 2004/0248790 A1 | 12/2004 | Hinuma et al. |
| 2005/0014643 A1 | 1/2005 | Lini et al. |
| 2005/0041370 A1 | 2/2005 | Wilk et al. |
| 2005/0058589 A1 | 3/2005 | Lundquist et al. |
| 2005/0058907 A1* | 3/2005 | Kurihara ............ H01M 4/0404 429/232 |
| 2005/0079349 A1 | 4/2005 | Hampden-Smith et al. |
| 2005/0079359 A1 | 4/2005 | Fujita et al. |
| 2005/0135993 A1 | 6/2005 | Xu et al. |
| 2005/0153130 A1 | 7/2005 | Long et al. |
| 2005/0196336 A1 | 9/2005 | Chatterjee et al. |
| 2005/0221981 A1 | 10/2005 | Wagh et al. |
| 2005/0233195 A1 | 10/2005 | Arnold et al. |
| 2005/0250011 A1 | 11/2005 | Mitchell et al. |
| 2005/0266990 A1 | 12/2005 | Iwasaki et al. |
| 2006/0008408 A1 | 1/2006 | Ho Yoon et al. |
| 2006/0057355 A1 | 3/2006 | Suzuki et al. |
| 2006/0079587 A1 | 4/2006 | Albert et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0002523 A1 | 1/2007 | Ando |
| 2007/0008677 A1 | 1/2007 | Zhong et al. |
| 2007/0048605 A1 | 3/2007 | Pez et al. |
| 2007/0104981 A1 | 5/2007 | Lam et al. |
| 2007/0113735 A1 | 5/2007 | Feaver et al. |
| 2007/0142222 A1 | 6/2007 | Erkey et al. |
| 2007/0166602 A1 | 7/2007 | Burchardt |
| 2007/0292732 A1 | 12/2007 | Feaver et al. |
| 2008/0011986 A1 | 1/2008 | Yamakawa et al. |
| 2008/0044726 A1 | 2/2008 | Feng et al. |
| 2008/0112876 A1 | 5/2008 | Dailey |
| 2008/0132632 A1 | 6/2008 | Schiraldi et al. |
| 2008/0145761 A1 | 6/2008 | Petrat et al. |

(56) References Cited

U.S. PATENT DOCUMENTS

| | | |
|---|---|---|
| 2008/0180881 A1 | 7/2008 | Feaver et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0293911 A1 | 11/2008 | Qureshi et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0286160 A1 | 11/2009 | Kozono et al. |
| 2009/0305131 A1 | 12/2009 | Kumar et al. |
| 2010/0008021 A1 | 1/2010 | Hu et al. |
| 2010/0047671 A1 | 2/2010 | Chiang et al. |
| 2010/0051881 A1 | 3/2010 | Ahn et al. |
| 2010/0092370 A1 | 4/2010 | Zhang et al. |
| 2010/0097741 A1 | 4/2010 | Zhong et al. |
| 2010/0098615 A1 | 4/2010 | Tennison et al. |
| 2010/0110613 A1 | 5/2010 | Zhong et al. |
| 2010/0288970 A1 | 11/2010 | Watanabe et al. |
| 2010/0310941 A1 | 12/2010 | Kumta et al. |
| 2010/0316907 A1 | 12/2010 | Yamamoto et al. |
| 2010/0331179 A1 | 12/2010 | Feaver et al. |
| 2011/0002086 A1 | 1/2011 | Feaver et al. |
| 2011/0028599 A1 | 2/2011 | Costantino et al. |
| 2011/0053765 A1 | 3/2011 | Feaver et al. |
| 2011/0111284 A1 | 5/2011 | Maeshima et al. |
| 2011/0159375 A1 | 6/2011 | Feaver et al. |
| 2011/0177393 A1 | 7/2011 | Park et al. |
| 2011/0199716 A1 | 8/2011 | Feaver et al. |
| 2011/0200848 A1 | 8/2011 | Chiang et al. |
| 2011/0223494 A1 | 9/2011 | Feaver et al. |
| 2011/0281180 A1 | 11/2011 | Kim et al. |
| 2011/0287189 A1 | 11/2011 | Shembel |
| 2012/0045685 A1 | 2/2012 | Iguchi et al. |
| 2012/0081838 A1 | 4/2012 | Costantino et al. |
| 2012/0129049 A1 | 5/2012 | Rayner |
| 2012/0156567 A1 | 6/2012 | Ayme-Perrot et al. |
| 2012/0183856 A1 | 7/2012 | Cui et al. |
| 2012/0202033 A1 | 8/2012 | Chang et al. |
| 2012/0241691 A1 | 9/2012 | Soneda et al. |
| 2012/0251876 A1 | 10/2012 | Jagannathan |
| 2012/0262127 A1 | 10/2012 | Feaver et al. |
| 2012/0264020 A1 | 10/2012 | Burton et al. |
| 2012/0305651 A1 | 12/2012 | Anderson et al. |
| 2012/0308870 A1 | 12/2012 | Okuda et al. |
| 2012/0321959 A1 | 12/2012 | Yushin et al. |
| 2013/0004841 A1 | 1/2013 | Thompkins et al. |
| 2013/0020349 A1 | 1/2013 | Feaver et al. |
| 2013/0082213 A1 | 4/2013 | Duncan et al. |
| 2013/0169238 A1 | 7/2013 | Rojeski |
| 2013/0189575 A1 | 7/2013 | Anguchamy et al. |
| 2013/0244862 A1 | 9/2013 | Ivanovici et al. |
| 2013/0252082 A1 | 9/2013 | Thompkins et al. |
| 2013/0280601 A1 | 10/2013 | Geramita et al. |
| 2013/0295462 A1 | 11/2013 | Atanassova et al. |
| 2013/0321982 A1 | 12/2013 | Feaver et al. |
| 2013/0337334 A1 | 12/2013 | Tao et al. |
| 2013/0344391 A1 | 12/2013 | Yushin et al. |
| 2014/0038042 A1 | 2/2014 | Rios et al. |
| 2014/0094572 A1 | 4/2014 | Costantino et al. |
| 2014/0170482 A1 | 6/2014 | Park et al. |
| 2014/0220456 A1 | 8/2014 | Costantino et al. |
| 2014/0272592 A1 | 9/2014 | Thompkins et al. |
| 2014/0287317 A1 | 9/2014 | Tiquet et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0062781 A1 | 3/2015 | Feaver et al. |
| 2015/0162603 A1 | 6/2015 | Yushin et al. |
| 2015/0207148 A1 | 7/2015 | Kimura et al. |
| 2015/0238917 A1 | 8/2015 | Mulik et al. |
| 2015/0255800 A1 | 9/2015 | Feaver et al. |
| 2015/0283534 A1 | 10/2015 | Costantino et al. |
| 2016/0039970 A1 | 2/2016 | Kron et al. |
| 2016/0043384 A1 | 2/2016 | Zhamu et al. |
| 2016/0104882 A1 | 4/2016 | Yushin et al. |
| 2016/0122185 A1 | 5/2016 | Feaver et al. |
| 2016/0133394 A1 | 5/2016 | Sakshaug et al. |
| 2016/0344030 A1 | 11/2016 | Sakshaug et al. |
| 2016/0372750 A1 | 12/2016 | Chang et al. |
| 2017/0015559 A1 | 1/2017 | Costantino et al. |
| 2017/0152340 A1 | 6/2017 | Geramita et al. |
| 2017/0155148 A1 | 6/2017 | Costantino et al. |
| 2017/0170477 A1 | 6/2017 | Sakshaug et al. |
| 2017/0346084 A1 | 11/2017 | Sakshaug et al. |
| 2017/0349442 A1 | 12/2017 | Feaver et al. |
| 2018/0097240 A1 | 4/2018 | Feaver et al. |
| 2018/0294484 A1 | 10/2018 | Fredrick et al. |
| 2018/0331356 A1 | 11/2018 | Feaver et al. |
| 2019/0097222 A1 | 3/2019 | Feaver et al. |
| 2019/0103608 A1 | 4/2019 | Costantino et al. |

FOREIGN PATENT DOCUMENTS

| | | |
|---|---|---|
| CN | 1762900 A | 4/2006 |
| CN | 1883068 A | 12/2006 |
| CN | 1986401 A | 6/2007 |
| CN | 101194384 A | 6/2008 |
| CN | 101318648 A | 12/2008 |
| CN | 101604743 A | 12/2009 |
| CN | 101969120 A | 2/2011 |
| CN | 102482095 A | 5/2012 |
| CN | 102820455 A | 12/2012 |
| CN | 102834955 A | 12/2012 |
| CN | 103094528 A | 5/2013 |
| CN | 103746098 A | 4/2014 |
| CN | 104108698 A | 10/2014 |
| CN | 102509781 B | 11/2015 |
| DE | 10 2010 049 249 A1 | 4/2012 |
| EP | 0 649 815 A1 | 4/1995 |
| EP | 0 861 804 A1 | 9/1998 |
| EP | 1 049 116 A1 | 11/2000 |
| EP | 1 052 716 A2 | 11/2000 |
| EP | 1 115 130 A1 | 7/2001 |
| EP | 1 248 307 A1 | 10/2002 |
| EP | 1 514 859 A2 | 3/2005 |
| EP | 2 117 068 A1 | 11/2009 |
| EP | 2 983 186 A1 | 2/2016 |
| JP | 2-300222 A | 12/1990 |
| JP | 4-59806 A | 2/1992 |
| JP | 4-139174 A | 5/1992 |
| JP | 5-117493 A | 5/1993 |
| JP | 5-156121 A | 6/1993 |
| JP | 5-320955 A | 12/1993 |
| JP | 7-232908 A | 9/1995 |
| JP | 8-59919 A | 3/1996 |
| JP | 8-112539 A | 5/1996 |
| JP | 9-63905 A | 3/1997 |
| JP | 9-275042 A | 10/1997 |
| JP | 9-328308 A | 12/1997 |
| JP | 10-297912 A | 11/1998 |
| JP | 2001-89119 A | 4/2001 |
| JP | 2001-278609 A | 10/2001 |
| JP | 2002-532869 A | 10/2002 |
| JP | 2004-67498 A | 3/2004 |
| JP | 2004-514637 A | 5/2004 |
| JP | 2004-203715 A | 7/2004 |
| JP | 2004-221332 A | 8/2004 |
| JP | 2004-315283 A | 11/2004 |
| JP | 2005-93984 A | 4/2005 |
| JP | 2005-132696 A | 5/2005 |
| JP | 2005-136397 A | 5/2005 |
| JP | 2005-187320 A | 7/2005 |
| JP | 2006-168597 A | 6/2006 |

(56) References Cited

FOREIGN PATENT DOCUMENTS

| | | |
|---|---|---|
| JP | 2006-248848 A | 9/2006 |
| JP | 2006-264993 A | 10/2006 |
| JP | 2007-115749 A | 5/2007 |
| JP | 2008-7387 A | 1/2008 |
| JP | 2008-94925 A | 4/2008 |
| JP | 2009-259803 A | 11/2009 |
| JP | 2012-121796 A | 6/2012 |
| WO | 95/01165 A1 | 1/1995 |
| WO | 98/30496 A1 | 7/1998 |
| WO | 02-39468 A2 | 5/2002 |
| WO | 2004/087285 A1 | 10/2004 |
| WO | 2004-099073 A2 | 11/2004 |
| WO | 2004/110930 A1 | 12/2004 |
| WO | 2005/043653 A1 | 5/2005 |
| WO | 2007/061761 A1 | 5/2007 |
| WO | 2008/047700 A1 | 4/2008 |
| WO | 2008/113133 A1 | 9/2008 |
| WO | 2009/032104 A2 | 3/2009 |
| WO | 2010/032782 A1 | 3/2010 |
| WO | 2010/059749 A1 | 5/2010 |
| WO | 2010/138760 A2 | 12/2010 |
| WO | 2011/002536 A2 | 1/2011 |
| WO | 2011/003033 A1 | 1/2011 |
| WO | 2012/045002 A1 | 4/2012 |
| WO | 2012/071916 A1 | 6/2012 |
| WO | 2012/092210 A1 | 7/2012 |
| WO | 2013/120009 A1 | 8/2013 |
| WO | 2013/120011 A1 | 8/2013 |
| WO | 2014/201275 A2 | 12/2014 |

OTHER PUBLICATIONS

Alcañiz-Monge et al., "Methane Storage in Activated Carbon Fibres," *Carbon* 35(2):291-297, 1997.
Anderegg, "Grading Aggregates: II—The Application of Mathematical Formulas to Mortars," *Industrial and Engineering Chemistry* 23(9): 1058-1064, 1931.
Andreasen et al., "Ueber die Beziehung zwischen Kornabstufung und Zwischenraum in Produkten aus losen Körnern (mit einigen Experimenten)," *Kolloid-Zeitschrift* 50(3):217-228, Mar. 1930, with translation of summary. (17 pages).
Babić et al., "Carbon cryogel as support of platinum nano-sized electrocatalyst for the hydrogen oxidation reaction," *Electrochimica Acta* 51:3820-3826, 2006.
Babić et al., "Characterization of carbon cryogel synthesized by sol-gel polycondensation and freeze-drying," *Carbon* 42:2617-2624, 2004.
Babić et al., "Characterization of carbon cryogels synthesized by sol-gel polycondensation," *J. Serb. Chem. Soc.* 70(1):21-31, 2005.
Barbieri et al., "Capacitance limits of high surface area activated carbons for double layer capacitors," *Carbon* 43:1303-1310, 2005.
Barton et al., "Tailored Porous Materials," *Chem. Mater.* 11:2633-2656, 1999.
Beattie et al., "High-Capacity Lithium-Air Cathodes," *J. Electrochem. Soc.* 156(1):A44-A47, 2009.
Besenhard, "Handbook of battery materials," *Weinheim, Wiley—VCH, Weinheim*, New York, 398-401, Dec. 31, 1999.
Bock et al., "Structural Investigation of Resorcinol Formaldehyde and Carbon Aerogels Using SAXS and BET," *Journal of Porous Materials* 4:287-294, 1997.
Buiel, et al., "Li-insertion in hard carbon anode materials for Li-ion batteries," *Electrochimica Acta* 45:121-130, 1999.
Burchell et al., "Low Pressure Storage of Natural Gas for Vehicular Applications," *The Engineering Society for Advancing Mobility Land Sea Air and Space*, Government/Industry Meeting, Washington D.C., Jun. 19-21, 2000, 7 pages.
Butler et al., "Braking Performance Test Procedure for the Hybrid Vehicle Energy Storage Systems: Capacitor Test Results," *Joint International Meeting of the Electrochemical Society, Abstract 684*, Honolulu, HI, Oct. 3-8, 2004, 5 pages.

Cao et al., "Li-ion capacitors with carbon cathode and hard carbon/stabilized lithium metal powder anode electrodes," *Journal of Power Sources* 213:180-185, Apr. 2012.
Chmiola et al., "Anomalous Increase in Carbon Capacitance at Pore Sizes Less Than 1 Nanometer," *Science* 313:1760-1763, Sep. 22, 2006.
Conway et al., "Partial Molal Volumes of Tetraalkylammonium Halides and Assignment of Individual Ionic Contributions," *Trans. Faraday Soc.* 62:2738-2749, 1966.
Czakkel et al., "Influence of drying on the morphology of resorcinol-formaldehyde-based carbon gels," *Microporous and Mesoporous Materials* 86:124-133, 2005.
Débart et al., "α-$MnO_2$ Nanowires: A Catalyst for the $O_2$ Electrode in Rechargeable Lithium Batteries," *Agnew. Chem. Int. Ed.* 47:4521-4524, 2008.
Ding et al., "How Conductivities and Viscosities of PC-DEC and PC-EC Solutions of $LiBF_4$, $LiPF_6$, LiBOB, $Et_4NBF_4$, and $Et_4NBF_6$ Differ and Why," *Journal of the Electrochemical Society* 151(12):A2007-A2015, 2004.
Dinger et al., "Particle Packing III—Discrete versus Continuous Particle Sizes," *Interceram* 41(5):332-334, 1992.
Dinger et al., "Particle Packing IV—Computer Modelling of Particle Packing Phenomena," *Interceram* 42(3):150-152, 1993.
Edward, "Molecular Volumes and the Stokes-Einstein Equation," *Journal of Chemical Education* 47(4):261-270, Apr. 1970.
Eikerling et al., "Optimized Structure of Nanoporous Carbon-Based Double-Layer Capacitors," *Journal of the Electrochemical Society* 152(1):E24-E33, 2005.
Endo et al., "Morphology and organic EDLC applications of chemically activated AR-resin-based carbons," *Carbon* 40:2613-2626, 2002.
Feaver et al., "Activated carbon cryogels for low pressure methane storage," *Carbon* 44:590-593, 2006.
Furnas, "Grading Aggregates I—Mathematical Relations for Beds of Broken Solids of Maximum Density," *Industrial and Engineering Chemistry* 23(9): 1052-1058, 1931.
Gao et al., "Nitrogen-rich graphene from small molecules as high performance anode material," *Nanotechnology* 25:415402, 2014, 8 pages.
Gouérec et al., "Preparation and Modification of Polyacrylonitrile Microcellular Foam Films for Use as Electrodes in Supercapacitors," *Journal of The Electrochemical Society* 148(1):A94-A101, 2001.
Hahn et al., "A dilatometric study of the voltage limitation of carbonaceous electrodes in aprotic EDLC type electrolytes by charge-induced strain," *Carbon* 44:2523-2533, 2006.
Hasegawa et al., "Preparation of carbon gel microspheres containing silicon powder for lithium ion battery anodes," *Carbon* 42:2573-2579, 2004.
Hirscher et al., "Are carbon nanostructures an efficient hydrogen storage medium?" *Journal of Alloys and Compounds* 356-357:433-437, 2003.
Hong et al., "Hydrogen evolution inhibition with diethylenetriamine modification of activated carbon for a lead-acid battery," *RSC Adv.* 4:33574-33577, 2014.
Hsieh et al., "Synthesis of mesoporous carbon composite and its electric double-layer formation behavior," *Microporous and Mesoporous Materials* 93:232-239, 2006.
Hu et al., "Effects of electrolytes and electrochemical pretreatments on the capacitive characteristics of activated carbon fabrics for supercapacitors," *Journal of Power Sources* 125:299-308, 2004.
Inomata et al., "Natural gas storage in activated carbon pellets without a binder," *Carbon* 40:87-93, 2002.
Job et al., "Carbon aerogels, cryogels and xerogels: Influence of the drying method on the textural properties of porous carbon materials," *Carbon* 43:2481-2494, 2005.
Job et al., "Highly dispersed platinum catalysts prepared by impregnation of texture-tailored carbon xerogels," *Journal of Catalysis* 240:160-171, 2006.
Job et al., "Synthesis of transition metal-doped carbon xerogels by solubilization of metal salts in resorcinol-formaldehyde aqueous solution," *Carbon* 42:3217-3227, 2004.
Khomenko et al., "High-voltage asymmetric supercapacitors operating in aqueous electrolyte," *Appl. Phys. A* 82:567-573, 2006.

(56) References Cited

OTHER PUBLICATIONS

Kim et al., "Correlation between the capacitor performance and pore structure," *Tanso* 221:31-39, 2006.
Kim et al., "Adsorption of phenol and reactive dyes from aqueous solution on carbon cryogel microspheres with controlled porous structure," *Microporous and Mesoporous Materials* 96:191-196, 2006.
Kocklenberg et al., "Texture control of freeze-dried resorcinol-formaldehyde gels," *Journal of Non-Crystalline Solids* 225:8-13, 1998.
Konno et al., "Preparation of activated carbon having the structure derived from biomass by alkali activation with NaOH, and its application for electric double-layer capacitor," *Tanso* 231:2-7, 2008.
Kowalczyk et al., "Estimation of the pore-size distribution function from the nitrogen adsorption isotherm. Comparison of density functional theory and the method of Do and co-workers," *Carbon* 41:1113-1125, 2003.
Lozano-Castelló et al., "Influence of pore structure and surface chemistry on electric double layer capacitance in non-aqueous electrolyte," *Carbon* 41:1765-1775, 2003.
Lozano-Castelló et al., "Powdered Activated Carbons and Activated Carbon Fibers for Methane Storage: A Comparative Study," *Energy & Fuels* 16:1321-1328, 2002.
McEwen et al., "Nonequeous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.
Miller, "Pulse Power Performance of Electrochemical Capacitors: Technical Status Of Present Commercial Devices," Proceedings of the 8th International Seminar on Double Layer Capacitors and Similar Energy Storage Devices, Deerfield Beach, Florida, Dec. 7-9, 1998, 9 pages.
Naoi et al., "Second generation 'nanohybrid supercapacitor': Evolution of capacitive energy storage devices," *Energy Environ. Sci.* 5:9363-9373, 2012.
Nishihara et al., "Preparation of resorcinol-formaldehyde carbon cryogel microhoneycombs," *Carbon* 42:899-901, 2004.
Ogasawara et al., "Rechargeable $LI_2O_2$ Electrode for Lithium Batteries," *Journal American Chemical Society* 128(4):1390-1393, 2006.
Otowa et al., "Production and adsorption characteristics of MAXSORB: High-surface-area active carbon," *Gas seperation and Purification* 7(4):241-245, 1993.
Pääkkö, "Long and entangled native cellulose I nanofibers allow flexible aerogels and hierarchically porous templates for functionalities," *Soft Matter* 4:2492-2499, 2008.
Pekala et al., "Aerogels derived from multifunctional organic monomers," *Journal of Non-Crystalline Solids* 145:90-98, 1992.
Pekala et al., "Structure of Organic Aerogels. 1. Morphology and Scaling," *Macromolecules* 26:5487-5493, 1993.
Pekala, "Organic aerogels from the polycondensation of resorcinol with formaldehyde," *Journal of Materials Science* 24:3221-3227, 1989.
Perrin et al., "Methane Storage within Dry and Wet Active Carbons: A Comparative Study," *Energy & Fuels* 17:1283-1291, 2003.
Pojanavaraphan et al., "Prevulcanized natural rubber latex/clay aerogel nanocomposites," *European Polymer Journal* 44:1968-1977, 2008.
Qu et al., "Studies of activated carbons used in double-layer capacitors," *Journal of Power Sources* 74:99-107, 1998.
Ravikovitch et al., "Unified Approach to Pore Size Characterization of Microporous Carbonaceous Materials from $N_2$, Ar, and $CO_2$ Adsorption Isotherms," *Langmuir* 16:2311-2320, 2000.
Read et al., "Oxygen Transport Properties of Organic Electrolytes and Performance of Lithium/Oxygen Battery," *J. Electrochem. Soc.* 150(10):A1351-A1356, 2003.
Read, "Characterization of the Lithium/Oxygen Organic Electrolyte Battery," *J. Electrochemical Soc.* 149(9):A1190-A1195, 2002.
Read, "Ether-Based Electrolytes for the Lithium/Oxygen Organic Electrolyte Battery," *J. Electrochem. Soc.* 153(1):A96-A100, 2006.
Reichenauer et al., "Microporosity in carbon aerogels," *Journal of Non-Crystalline Solids* 225:210-214, 1998.
Salitra et al., "Carbon Electrodes for Double-Layer Capacitors I. Relations Between Ion and Pore Dimensions," *Journal of The Electrochemical Society* 147(7):2486-2493, 2000.
Setoyama et al., "Simulation Study On The Relationship Between A High Resolution $\alpha_s$-Plot And The Pore Size Distribution For Activated Carbon," *Carbon* 36(10):1459-1467, 1998.
Simon et al., "Materials for electrochemical capacitors," *Nature Materials* 7:845-854, Nov. 2008.
Sivakkumar et al., "Evaluation of Lithium-ion capacitors assembled with pre-lithiated graphite anode and activated carbon cathode," *Electrochimica Acta* 65:280-287, Jan. 2012.
Takeuchi et al., "Removal of single component chlorinated hydrocarbon vapor by activated carbon of very high surface area," *Separation and Purification Technology* 15:79-90, 1999.
Tamon et al., "Influence of freeze-drying conditions on the mesoporosity of organic gels as carbon precursors," *Carbon* 38:1099-1105, 2000.
Tamon et al., "Preparation of mesoporous carbon by freeze drying," *Carbon* 37:2049-2055, 1999.
Tonanon et al., "Influence of surfactants on porous properties of carbon cryogels prepared by sol-gel polycondensation of resorcinol and formaldehyde," *Carbon* 41:2981-2990, 2003.
Toyo Tanso Carbon Products, "Special Graphite and Compound Material Products," *Toyo Tanso Co., Ltd.* Catalog published 2008.
Toyo Tanso, "Graphite Applications," *Toyo Tanso Co., Ltd.* Catalog published 1998. (Machine Translation Attached).
Toyo Tanso, "Isotropic Graphite Engineering Data," *Toyo Tanso Co., Ltd.* Catalog published 1994.
Toyo Tanso, "Isotropic Graphite Technical Data," *Toyo Tanso Co., Ltd.* Catalog published 1997.
Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.
WebElements, "Lead: the essentials,", attached as a PDF showing the webpage availability date as of Aug. 14, 2009 (via the Wayback Machine), web URL is http://www.webelements.com/lead/, pp. 1-3.
Wei et al., "A novel electrode material for electric double-layer capacitors," *Journal of Power Sources* 141:386-391, 2005.
Williford et al., "Air electrode design for sustained high power operation of Li/air batteries," *Journal of Power Sources* 194:1164-1170, 2009.
Wu et al., "Fabrication and nano-structure control of carbon aerogels via a microemulsion-templated sol-gel polymerization method," *Carbon* 44:675-681, 2006.
Xie et al., "Pore size control of Pitch-based activated carbon fibers by pyrolytic deposition of propylene," *Applied Surface Science* 250:152-160, 2005.
Xu et al., "Synthesis of mesoporous carbon and its adsorption property to biomolecules," *Microporous and Mesoporous Materials* 115:461-468, 2008.
Xu et al., "Optimization of Nonaqueous Electrolytes for Primary Lithium/Air Batteries Operated in Ambient Environment," *Journal of the Electrochemical Society* 156(10):A773-A779, 2009.
Yamamoto et al., "Control of mesoporosity of carbon gels prepared by sol-gel polycondensation and freeze drying," *Journal of Non-Crystalline Solids* 288:46-55, 2001.
Yamamoto et al., "Porous properties of carbon gel microspheres as adsorbents for gas separation," *Carbon* 42:1671-1676, 2004.
Yamamoto et al., "Preparation and characterization of carbon cryogel microspheres," *Carbon* 40:1345-1351, 2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte $Li/O_2$ battery," *Journal of Power Sources* 195:1235-1240, 2010.
Abánades et al., "Experimental Analysis of Direct Thermal Methane Cracking," *International Journal of Hydrogen Energy* 36(20):12877-12886, 2011.

(56) References Cited

OTHER PUBLICATIONS

Fotouhi et al., "A Low Cost, Disposable Cable-Shaped Al-Air Battery for Portable Biosensors," *J. Micromech. Microeng.* 26:055011, 2016. (8 pages).
Indo German Carbons Limited, "Activated Carbon," Apr. 2009, URL=http://www.igcl.com/php/activated_carbon.php, download date Nov. 29, 2018, 3 pages.
Pimenta et al., "Studying disorder in graphite-based systems by Raman spectroscopy," *Phys. Chem. Chem. Phys.* 9:1276-1291, 2007.
Huang et al., "Nitrogen-containing mesoporous carbons prepared from melamine formaldehyde resins with $CaCl_2$ as a template," J. Colloid Interface Sci. 363(1):193-198, 2011.
Sigma Aldrich, "Triton X-100," Data Sheet, URL=https://www.sigmaaldrich.com/catalog/product/roche/11332481001?lang=en&region=US, download date Feb. 21, 2019.
Zhao et al., "Highly-Ordered Mesoporous Carbon Nitride with Ultrahigh Surface Area and Pore Volume as a Superior Dehydrogenation Catalyst," Chem. Mater. 26(10):3151-3161, 2014.

* cited by examiner

FLOW ULTRACAPACITOR

BACKGROUND

Technical Field

The present invention generally relates to electrochemical energy storage devices and, in particular, to flow ultracapacitors.

Description of the Related Art

Ultracapacitors have advantages in electrical grid applications because of their extraordinary cycle life and longevity, but using existing commercial ultracapacitors would cost $14,800/kWh (not counting module and system integration cost); which is not economically feasible. There are major efforts underway to reduce cost, but ultracapacitors will continue to be designed for high volumetric energy and power density making them most useful for portable applications.

Flow batteries are designed for the grid and have large electrolyte storage tanks with relatively small cells. Sodium sulfur batteries using molten sodium as an electrode are another high energy density device with relevance at grid scale. Unfortunately these systems cost in the $300-500/kWh range. Most are capable of longer cycle lives than lead acid batteries, perhaps reaching 2000-3000 deep discharge cycles. Vanadium and zinc bromide systems operate at room temperature, but sodium sulfur batteries operate at high temperatures ~300° C.—requiring vacuum insulation. Sodium sulfur batteries have high efficiency at 90%, while vanadium flow batteries only reach 65-75% round trip efficiency. Generally, flow batteries or molten metal batteries are still too expensive and have substantial operating drawbacks such as poor cycle life, low efficiency, and high operating temperature.

Ultracapacitors solve problems associated with batteries but are far too expensive for bulk storage grid applications. Accordingly, there is a need in the art for energy and cost efficient electrochemical energy storage devices having fast response, high power, and excellent cycle life. The present invention provides these and other related benefits.

BRIEF SUMMARY

In general terms, the present invention is directed to electrochemical energy storage devices. The devices are well suited for any number of applications, and can be scaled for use in bulk electrical storage and distribution grids (e.g., greater than 10 MW). Due to their increased efficiency, the devices are expected to provide an economical solution to bulk electrical energy storage (e.g., about 500 ($/kWh). The disclosed devices include electrochemical cells comprising electrode material which is suspended in an appropriate electrolyte to form an electrode/electrolyte suspension. Electrochemical energy is stored within the device in the form of charged electrode material. In some embodiments, the charged electrode material remains within the electrochemical cell, while in other embodiments the charged electrode material flows through the device into external storage containers where it is stored until used.

Accordingly, one embodiment of the present invention is an electrochemical energy storage device, wherein the electrochemical energy storage device comprises:
   (a) electrode material;
   (b) electrolyte;
   (c) an electrochemical cell; and
   (d) first and second charge storage tanks in fluid connection with the electrochemical cell;
   wherein the electrode material is suspended in the electrolyte, and wherein the electrochemical energy storage device is configured to allow the suspended electrode material to flow through the electrochemical cell to the first and second charge storage tanks in the presence of a voltage applied to the electrochemical cell.

In other embodiments, the electrochemical energy storage device is a static device and the charged electrode material remains within the electrochemical cell. In such embodiments, the electrochemical energy storage device comprises:
   (a) electrode material;
   (b) electrolyte; and
   (c) an electrochemical cell,
   wherein the electrode material is suspended in the electrolyte.

Methods for use of the disclosed devices in electrical energy storage and distribution applications are also provided.

These and other aspects of the invention will be apparent upon reference to the attached drawings and following detailed description. To this end, various references are set forth herein which describe in more detail certain procedures, compounds and/or compositions, and are hereby incorporated by reference in their entirety.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Definitions

"Electrochemical cell" refers to a device used for generating an electromotive force (voltage) and current from chemical reactions, or inducing a chemical reaction by a flow of current. Electrochemical cells generally comprise a first and second current collector (e.g., electrode) and an electrolyte. Electrochemical cells may comprise two half-cells, each half cell containing a current collector and the same or different electrolyte. The two half cells may separated by an inert porous separator (e.g., salt bridge). Upon application of a voltage to the current collectors, ions, atoms, or molecules from one half-cell lose electrons (oxidation) to the current collector while ions, atoms, or molecules from the other half-cell gain electrons (reduction) from the electrode. The stored electrical energy may be released through the current collectors upon discharge.

"Suspension" refers to a heterogeneous mixture of a solid (e.g., electrode material) and a liquid (e.g., electrolyte). Generally the suspensions described herein are fluid and can be moved through a device by means of gravity and/or pumping means. Suspensions include "colloids."

A "colloid" is a suspension in which the solid component does not separate out from the liquid component upon standing.

"Electrode material" refers to a material capable of holding, acquiring and/or releasing an electrical charge (i.e., electron(s)). In this regard, electrode materials are materials capable of participating in the oxidation/reduction or electric double layer capacitor (EDLC) reaction of an electrochemical cell. Electrode materials include metals and non-metals. Non-limiting examples of electrode materials are provided below. Other electrode materials are well known to one of ordinary skill in the art.

"Hydraulic radius" is calculated from the following formula:

$$R_h = \frac{A}{P}$$

where $R_h$ is the hydraulic radius, A is the cross sectional area of flow (e.g., of a flow channel) and P is the wetted perimeter (the portion of the cross-section's perimeter that is wet)

"Aspect ratio" refers to the ratio of the width of a shape (e.g., a flow channel or charge channel) to its height.

"Electrolyte" means a substance containing free ions such that the substance is electrically conductive.

"Thixotropic" refers to the property of certain gels or fluids (e.g., electrolytes) that are thick (viscous) under normal conditions, but flow (become thin, less viscous) over time when shaken, agitated, or otherwise stressed. Generally, a thixotropic fluid will return to a more viscous state upon standing.

"Carbon material" refers to a material or substance comprised substantially of carbon. Carbon materials include amorphous and crystalline carbon materials. Examples of carbon materials include, but are not limited to, activated carbon, carbon black, graphite, graphene, hard carbon, carbon nanotubes, buckyballs, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like.

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphite.

"Cryogel" refers to a dried gel that has been dried by freeze drying.

"Pyrolyzed cryogel" is a cryogel that has been pyrolyzed but not yet activated.

"Activated cryogel" is a cryogel which has been activated to obtain activated carbon material.

"Xerogel" refers to a dried gel that has been dried by air drying, for example, at or below atmospheric pressure.

"Pyrolyzed xerogel" is a xerogel that has been pyrolyzed but not yet activated.

"Activated xerogel" is a xerogel which has been activated to obtain activated carbon material.

"Aerogel" refers to a dried gel that has been dried by supercritical drying, for example, using supercritical carbon dioxide.

"Pyrolyzed aerogel" is an aerogel that has been pyrolyzed but not yet activated.

"Activated aerogel" is an aerogel which has been activated to obtain activated carbon material.

"Activate" and "activation" each refer to the process of heating a raw material or carbonized/pyrolyzed substance at an activation dwell temperature during exposure to oxidizing atmospheres (e.g., carbon dioxide, oxygen, steam or combinations thereof) to produce an "activated" substance (e.g., activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon, nitrogen or combinations thereof) or in a vacuum such that the targeted material collected at the end of the process is primarily carbon.

"Pyrolyzed" refers to a material or substance, for example a carbon material, which has undergone the process of pyrolysis.

A "bi-functional catalyst" refers to a material which acts as a catalyst in both oxidation and reduction reactions. Bi-functional catalysts may be comprised of a single component or of several phases for example in the case where one component is catalytic for oxidation and the other is catalytic for reduction. Bi-functional catalysts within the context of the present disclosure include metals such as: iron, nickel, cobalt, manganese, copper, ruthenium, rhodium, palladium, osmium, iridium, gold, hafnium, platinum, titanium, rhenium, tantalum, thallium, vanadium, niobium, scandium, chromium, gallium, zirconium, molybdenum and oxides thereof (e.g., nickel oxide, iron oxide, etc.) as well as alloys thereof. Bi-functional catalysts also include carbides such as lithium carbide, magnesium carbide, sodium carbide, calcium carbide, boron carbide, silicon carbide, titanium carbide, zirconium carbide, hafnium carbide, vanadium carbide, niobium carbide, tantalum carbide, chromium carbide, molybdenum carbide, tungsten carbide, iron carbide, manganese carbide, cobalt carbide, nickel carbide and the like. Bi-functional catalysts may be present in elemental form, oxidized form (e.g., metal oxides, metal salts, etc.) or as part of a chemical compound.

"Electrochemical modifier" refers to any chemical element, compound comprising a chemical element or any combination of different chemical elements and compounds which enhances the electrochemical performance of a carbon material. Electrochemical modifiers can change (increase or decrease) the resistance, capacity, power performance, stability and other properties of a carbon material. Electrochemical modifiers generally impart a desired electrochemical effect. In contrast, an impurity in a carbon material is generally undesired and tends to degrade, rather than enhance, the electrochemical performance of the carbon material. Examples of electrochemical modifiers within the context of the present disclosure include, but are not limited to, elements, and compounds or oxides comprising elements, in groups 12-15 of the periodic table, other elements such as sulfur, tungsten and silver and combinations thereof. For example, electrochemical modifiers include, but are not limited to, lead, tin, antimony, bismuth, arsenic, tungsten, silver, zinc, cadmium, indium, silicon and combinations thereof as well as oxides of the same and compounds comprising the same.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution and pore length. Generally the pore structure of an activated carbon material comprises micropores and mesopores. For example, in certain embodiments the ratio of micropores to mesopores is optimized for enhanced electrochemical performance.

"Mesopore" generally refers to a pore having a diameter ranging from 2 nanometers to 50 nanometers while the term "micropore" refers to a pore having a diameter less than 2 nanometers.

Electrochemical Energy Storage Devices

As noted above, the present invention generally relates to devices and methods having utility in any number of electrical energy storage and distribution applications, including bulk electrical energy storage and distribution grids. In one embodiment the present invention is directed to an electrochemical energy storage device having high energy density and power capabilities as well as increased cycle life compared to other known electrical energy storage and distribution devices. In one embodiment, operation of the device includes flowing a suspension of electrode material in electrolyte through an electrochemical cell having a voltage applied thereto, and subsequently directing the electrode suspension into charge storage tanks. The device is discharged by reversing the flow of the electrode material. Such devices are generally referred to as flow devices herein. In a representative embodiment, the electrochemical energy storage device comprises:

(a) electrode material;
(b) electrolyte;
(c) an electrochemical cell; and
(d) first and second charge storage tanks in fluid connection with the electrochemical cell;

wherein the electrode material is suspended in the electrolyte, and wherein the electrochemical energy storage device is configured to allow the suspended electrode material to flow through the electrochemical cell to the first and second charge storage tanks in the presence of a voltage applied to the electrochemical cell.

Figure 1:
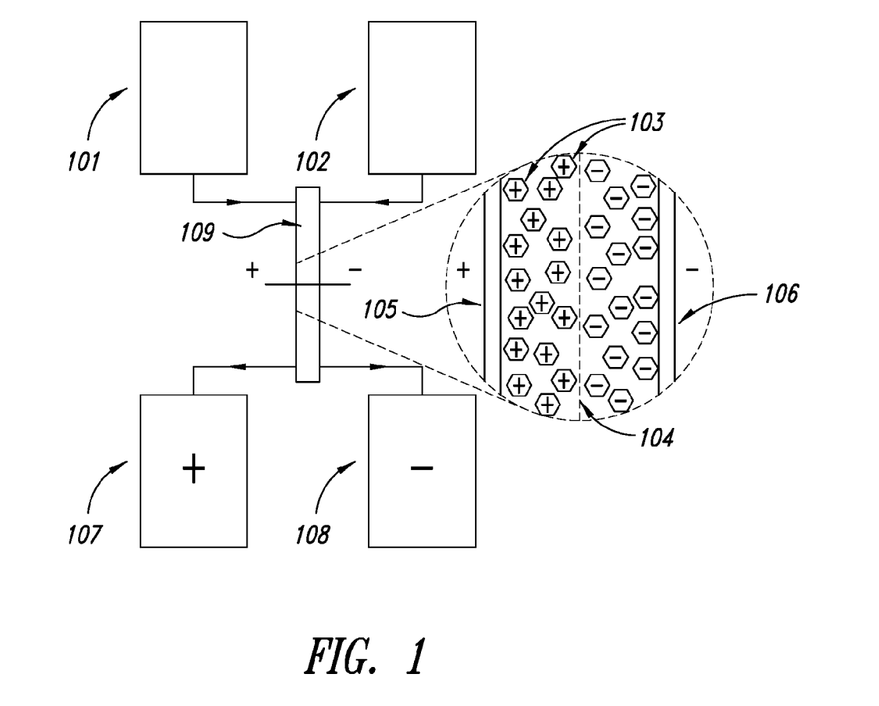
FIG. 1 shows a schematic of a representative flow device.

FIG. 1 depicts an exemplary device according to one embodiment of the present invention. Referring to FIG. 1, electrode material is suspended in an electrolyte to form a suspension. The electrode material and electrolyte are selected from any of the electrode materials and electrolytes known in the art, including those described below. The illustrated device includes storage containers 101, 102 for storage of uncharged suspended electrode material. Storage containers 101 and 102 are in fluid connection with an electrochemical cell 109. The electrochemical cell generally comprises a first and second current collector 105, 106. The current collectors may serve as a means for applying a voltage across the electrochemical cell to charge the electrode material and for distribution of electrical energy upon discharge of the electrode material. Current collectors may be prepared from any number of materials known in the art. In certain embodiments the current collectors comprise aluminum, copper, stainless steel, carbon, graphite, nickel or any other electrically conductive material that is compatible with the electrode/electrolyte suspension.

In some embodiments, the electrochemical cell comprises an inert porous separator 104 (e.g., porous polymer, porous glass or ceramic) interposed between the first and second current collectors. The separator serves to isolate negatively charged electrode material from positively charged electrode material, while allowing electrolyte to flow through the separator. The volume occupied between the first current collector 105 and the porous separator 104 defines a first flow channel, and the volume occupied between the second current collector 106 and the porous separator 104 defines a second flow channel. The dimensions of the first and second flow channels range from the macro down to microfluidic ranges (e.g., hydraulic radii ranging from about 100 nanometers to about 500 micrometers). This dimension can be optimized for a desired flow rate or charge time. Flow channels having various aspect ratios (e.g., from about 1 to about 100) and various sizes and shapes are also included.

FIG. 1 further illustrates first and second charge storage tanks 107, 108, which are in fluid connection with an end of the electrochemical cell. The charge storage tanks serve to store charged electrode material until discharge is desired. For example, the charged electrode material may be discharged through the current collectors by flowing the charged suspended electrode material back through the electrochemical cell as described in more detail below.

In other variations, the electrical energy stored in the charged electrode material/electrolyte suspension is not released through the same electrochemical cell in which it was charged. For example, in some embodiments the charged electrode/electrolyte suspension is injected into another system as a source of electrical energy. For example, the charged electrode/electrolyte suspension may be used to inject in any number of devices which use electricity as a power source. One non-limiting example of these embodiments includes use of the charged electrode/electrolyte suspension for powering an electric car, for example by pumping the charged electrode/electrolyte suspension through the car's electrical cell.

Other related embodiments include examples where the device comprises an electrode/electrolyte suspension and an electrochemical cell, but the device optionally does not include charge storage tanks. Instead, operation of the device includes flowing the electrode/electrolyte suspension through the electrochemical cell and then using the charged electrode/electrolyte suspension as a source of electrical energy in another device (electric car, etc.). The charged suspension may be stored prior to use or injected directly from the electrochemical cell into another device for use.

The charge storage tanks may optionally comprise an electrical insulation (e.g., glass or plastic) to reduce loss of electrical energy to the environment through static or atmospheric self-discharge. In some embodiments, charge storage tanks are equipped with a charging apparatus to maintain a trickle charge so that the charge storage tanks' charge is not depleted by self discharge. Furthermore, the charge storage tanks may be sized for the desired application. Thus, one advantage of the flow devices described herein is that the charge storage capacity is limited only by the physical size of the charge storage containers and not by the size of the electrochemical cell.

The embodiment depicted in FIG. 1 comprises a single electrochemical cell. It should be noted that alternative embodiments include devices having a plurality (i.e., more than 1) of electrochemical cells. The plurality of electrochemical cells can be connected in parallel or in series depending on the desired application. One of ordinary skill in the art will recognize the appropriate configuration for various applications. In some embodiments, the plurality of electrochemical cells are each fluidly connected to the same first and second charge storage tanks and/or the same uncharged suspended electrode storage tanks. In these embodiments, the flow of electrode material is diverted from the uncharged suspended electrode material storage tanks through the plurality of electrochemical cells. The suspended electrode material is then recombined into first and second charge storage tanks at an exit end of the plurality of electrochemical cells.

In other related embodiments, each of the plurality of electrochemical cells is connected to unique first and second uncharged suspended electrode storage tanks and/or unique first and second charge storage tanks. Such devices may also be connected in series or in parallel depending on the desired application.

Operation of certain embodiments of the device can be understood in general terms by referring again to FIG. 1. The electrical energy storage device generally operates by applying a voltage to the current collectors and initiating a flow of electrode material through the electrochemical cell and into the first and second charge storage tanks. Discharge of the device includes flowing the charged electrode material from the first and second charge tanks through the electrochemical cell where the charged electrode material is discharged through the current collectors. In some embodiments, flow of the electrode material through the device is controlled by gravity and/or a pump connected to the device.

As neutral particles of electrode material flow through the electrochemical cell, they become charged 103 when they come in contact with the current collectors. The fast Electric Double Layer Capacitance (EDLC) charging mechanism that operates within the devices can respond in the short time that an electrode particle may be in electrical contact with a current collector or other electrode particles. As the flow continues, the slurry gradually picks up substantial double layer capacitance from contact with the current collectors and also reaches equilibrium with itself through particle-to-particle interaction. As the electrode suspension reaches full charge passing through the electrochemical cell, it exits the cell and is deposited in the charge storage tanks. Altering the flow rate of the suspension as well as modifying the design of the channels to increase the surface area of the current collector can modify charging rates. Charging can also be altered by fluid dynamics which are controlled using the characteristics of the channel to increase or decrease the amount of time that particles are in contact with the surface of the current collector.

Discharge occurs through a similar mechanism by reversing the flow and flowing charged electrode material back through the cell where the electrode material is discharged through the current collectors.

Methods for use of the device, which may include the above steps, are contemplated within the scope of the present invention. For example, in some embodiments the disclosure provides a method for storing electrochemical energy, the method comprising:
(a) providing a device comprising:
 (i) electrode material;
 (ii) electrolyte;
 (iii) an electrochemical cell; and
 (iv) first and second charge storage tanks in fluid connection with the electrochemical cell;
(b) applying a voltage to the electrochemical cell; and
(c) flowing a suspension of the electrode material in the electrolyte through the electrochemical cell and into the first and second charge storage tanks.

Other embodiments of the method include discharging the device by flowing the suspension of electrode material from the first and second charge storage tanks through the electrochemical cell.

In another embodiment, the present invention is directed to a static device. Accordingly, one embodiment is directed to an electrochemical energy storage device comprising:
(a) electrode material;
(b) electrolyte; and
(c) an electrochemical cell,
wherein the electrode material is suspended in the electrolyte.

Figure 2:
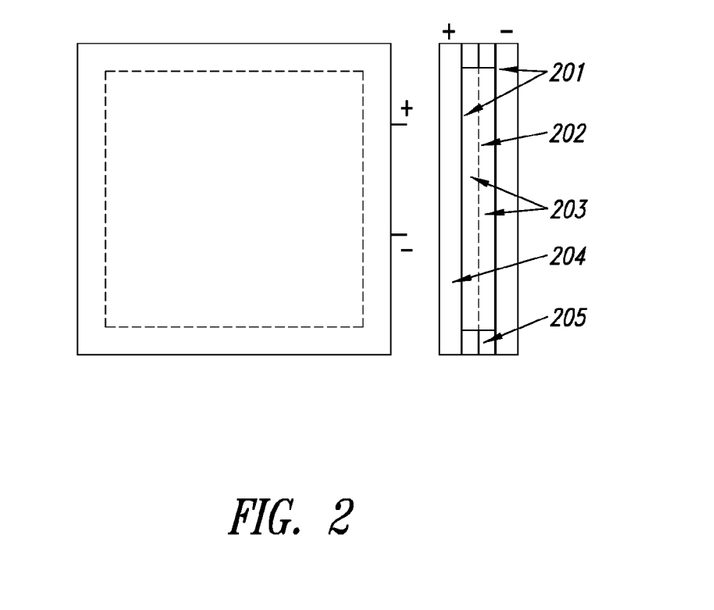
FIG. 2 depicts a representative static device.

Embodiments of the static devices have many features in common with the flow devices described above, except the electrode suspension does not flow through the device and leave the electrochemical cell, for example into charge storage containers. Instead, the charged electrode suspension remains in the electrochemical cell. For example, in some embodiments the electrochemical cell comprises an inert porous separator interposed between first and second current collectors. The volume occupied between the first or second current collector and the inert porous separator defines the dimensions of first and second charge channels, respectively. The dimensions of such charge channels can be varied as described above with respect to the flow channels of a flow device. Current collectors, electrode materials and electrolytes can also be selected based on the desired application from materials known in the art and as described herein with respect to other devices.

The static devices can be understood by reference to an exemplary embodiment depicted in FIG. 2. Referring to FIG. 2, the illustrated embodiment includes electrode material suspended in electrolyte (not depicted in FIG. 2) and first and second current collectors 201. Interposed between the current collectors is an inert porous separator 202. The volumes between the first current collector and the inert porous separator and the second current collector and the inert porous separator define first and second charge channels, respectively 203. The device includes an outer structure 204 for encasing the current collectors, electrode material and other internal components of the device. The outer structure is made from insulating materials commonly used for encasing electrical energy storage devices (e.g., glass, plastic and the like). Some embodiments also include gaskets 205 (e.g., Teflon™ and the like) to prevent leakage of electrolyte and electrode material from the device.

Methods for use of the static device are also included. One embodiment of the method comprises:

(a) providing an electrochemical energy storage device comprising:

(i) electrode material suspended in electrolyte; and (ii) an electrochemical cell, and (b) applying a voltage to the electrochemical cell.

Certain features of the above devices can be varied to optimize their performance for the desired application. Key parameters used to optimize the above embodiments include optimization of flow channel (and charge channel) dimensions and aspect ratios from the macro down to microfluidic ranges. In certain embodiments, microfluidically sized flow channels (e.g., from about 100 nm to about 500 micrometers) obviate the need for a separator membrane. If a membrane is required, porous glasses or ceramics may be used. In addition, the energy and power density of the devices can be optimized by adjusting electrode flow rates, pump pressures and device configurations.

A number of parameters are amendable to optimization. For example, methods for optimizing charge retention in storage tanks are included in the scope of the invention. These methods include, for example, controlling the atmosphere, trickle charging the tanks to counter self-discharge, and optimizing tank materials. Also, improving the cell configuration will allow control over the power. Experiments performed in support of the present invention have demonstrated that a suspended electrode material can be passed through a hypodermic needle; however, sedimentation and pumpability issues require optimization such as using coulombic charges, for example, as used in the polystyrene dispersion art.

In certain embodiments, the flow channels have microfluidic dimensions (e.g., hydraulic radii ranging from about 100 nanometers to about 500 micrometers) such that the negatively charged and positively charged electrode suspension can flow through the device without mixing with one another in the absence of a porous separator. For example, in some embodiments the dimensions of the electrochemical cell are sized to enable laminar flow of a first lamella containing a suspension of positively charged electrode material and electrolyte and a second lamella comprising a suspension of negatively charged electrode material and electrolyte, wherein the first and second lamellae flow in contact with one another without substantial mixing of the two lamellae.

In some embodiments, the device operating time is readily controlled by the size of the charge storage tanks. In some embodiments, the charge storage tanks range in size from less than 1 L to millions of liters or more. Accordingly, devices having various sizes of charge storage tanks are included within the scope of the invention. As noted above, various embodiments are provided having a plurality of electrochemical cells. Such devices can be designed (e.g., connected in parallel or series, etc.) to obtain an optimal power output, for example greater than 100 kW.

The devices are also capable of responding in the millisecond timeframe. Furthermore, since the devices include features similar to EDLC electrodes, and EDLC electrodes are known for their long calendar life (often multiple decades), the disclosed devices are expected to maintain their efficiency for long periods of time, for example more than 100,000 cycles. Mechanical accessories and cells may need to periodically be maintained or replaced.

In other embodiments, the devices have high efficiency (i.e., ratio of power release versus power needed to charge). In some embodiments, the device has an efficiency greater than 90%, greater than 95%, greater than 97% or even greater than 99%. Efficiency can be increased (and self discharge reduced) through proper electrode design, insulation, and atmosphere control in the head space of the charge storage tanks. Furthermore, in certain embodiments the devices are capable of less than 10%, less than 5% or even less than 3% loss in 24 hours (i.e., loss of charge upon standing). In some embodiments, electrical isolation of tubing and charge storage tanks is employed to reduce losses.

In other embodiments, the devices are capable of charging and discharging on second time scales (e.g., about 1 to 10 seconds). Accordingly, the devices are well suited for use in applications requiring fast charge and discharge cycles.

The power capacity of the devices can be varied according to the desired application. In some embodiments, the power capacity ranges from about 0.01 kW to about 1 kW, for example about 0.1 kW.

The voltage of the devices can be tailored to the desired application. Voltage is generally governed by the selection of electrolyte and in certain embodiments ranges from about 1V to about 9V. Aqueous electrolytes are generally employed at the lower voltage range, while ionic liquid electrolytes may be useful for the higher voltage range. In some typical embodiments, the voltage of the devices ranges from about 2.5V to about 4.5V Electrode Materials and Electrolytes The composition of the electrode material is not particularly limited. In this regard, any electrode material capable of being charged can be used. In some embodiments, the electrode material comprises carbon, for example an activated or unactivated carbon material. Other types of carbon useful as electrode material include graphite, hard carbon and coke.

In certain other embodiments, the electrode material comprises a material selected from silicon alloys, titania, transition metal oxides, mixtures of nickel, manganese and aluminum (NMC), mixtures of nickel, cobalt and aluminum (NMA), $LiCoO_2$, $LiFePO_4$, metal phosphates and $MoS_2$.

Other embodiments include devices comprising electrode materials comprise a material selected from lithium/aluminum alloys and FeS. In other embodiments, the electrode material comprises a material selected from sodium and sulfur. In still other embodiments, the electrode material comprises zinc, blends of high surface area carbon and zinc, or blends of high surface are carbon and bromine.

Still other embodiments include electrode materials selected from lithium, zinc, magnesium, aluminum, iron and calcium. Furthermore, owing to its particular oxidation/reduction properties, air may be used as an electrode in certain embodiments. Accordingly, some embodiments include device wherein at least a portion (e.g., a flow channel or charge channel) of the electrochemical device is open to air and the electrode material comprises air.

In particular embodiments include device comprising electrode materials selected from zinc, cadmium, iron oxide and silver oxide. In other embodiments, the electrode material comprises water or nickel oxide. Still other examples of electrode materials include zinc, cadmium hydroxide, zinc oxide, nickel hydroxide and nickel oxyhydroxide.

In yet other embodiments, the devices comprise electrode materials comprising metallic iron, nickel oxide, silver oxide, lead or lead oxide.

Furthermore, in some embodiments the device comprises two or more different electrode materials. For example, the device may comprise a first electrode material in a first flow or charge channel (i.e., the "anode material") and a second, different electrode material in a second flow or charge channel (i.e., the "cathode material"). Examples of devices comprising two different electrode materials include devices comprising a different type of carbon electrode material for the anode material and the cathode material. Other various exemplary embodiments of devices and their respective anode and cathode material are provided in Table 1.

TABLE 1

Exemplary Devices

| Device Type | Anode Material | Cathode Material |
| --- | --- | --- |
| Ultracapacitor | Carbon A | Carbon A |
| Asymmetric capacitor | Carbon A | Carbon B |
| Lithium ion battery | Graphite | NMC |
| | Hard carbon | NMA |
| | Coke | $LiCoO_2$ |
| | Silicon alloys | $LiFePO_4$ |
| | Titania | Metal phosphates |
| | Transition-metal oxides | $MoS_2$ |
| Bipolar lithium ion sulfide | Li-Al | FeS |
| Sodium/Sulfur | Sodium | Sulfur |
| Zinc/Bromine Flow (already in flow design) | Zinc/high surface area carbon | Bromine/high surface area carbon |
| Metal/Air (open to air) | Lithium Zinc Magnesium Aluminum Iron Calcium | Air (i.e., electrochemical cell is open to air) |

TABLE 1-continued

Exemplary Devices

| Device Type | Anode Material | Cathode Material |
| --- | --- | --- |
| Silver Oxide | Zinc Cadmium Iron oxide | Silver oxide |
| Nickel-Hydrogen | Water (hydrogen) | Nickel oxide |
| Nickel-Zinc | Zinc/zinc oxide | Nickel-hydroxide/nickel oxyhydroxide |
| Nickel-Cadmium | Cadmium hydroxide | Nickel hydroxide |
| Iron Metal | Metallic iron | Nickel oxide Air (cell open to air) Silver oxide |
| Lead Acid | Lead | Lead oxide |

As noted above, some embodiments include electrode materials comprising carbon. Carbon materials may be engineered with controlled pore size distribution, surface area, surface chemistry, density, and particle size at low cost. This enables optimization for different characteristics such as energy vs. power. The ability to produce a wide variety of carbons is critical to engineering a carbon for a flow ultracapacitor. Carbon materials useful as electrode material in the disclosed devices include the carbon materials described herein, carbon materials known in the art, commercially available carbon materials and the carbon materials described in U.S. Pat. Nos. 7,723,262 and 7,835,136; co-pending U.S. application Ser. No. 12/829,282 (U.S. Pub. No. 2011/002086); Ser. No. 13/046,572 (U.S. Pub. No. 2011/0223494); Ser. No. 12/965,709 (U.S. Pub. No. 2011/0159375); Ser. No. 13/336,975 and U.S. Provisional App. No. 61/613,790, which applications are hereby incorporated by reference in their entireties for all purposes.

Figure 3:
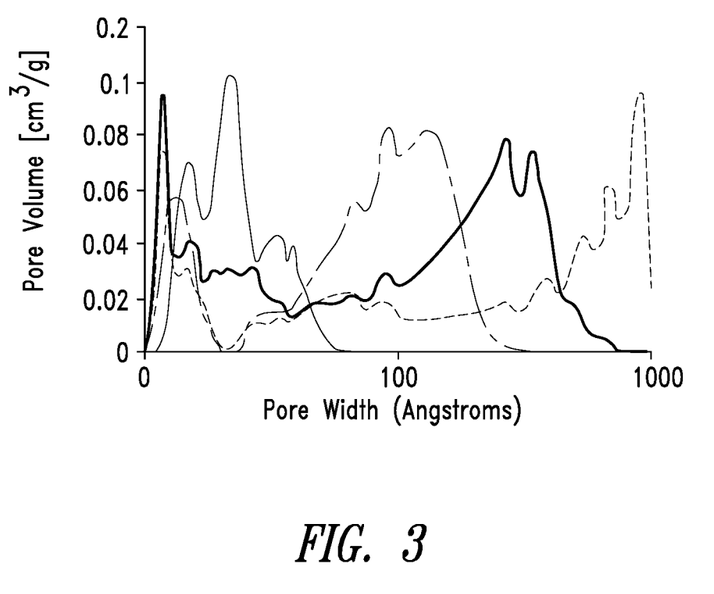
FIG. 3 shows carbon pore width vs. volume for various carbon materials.

FIG. 3 demonstrates carbon materials having various pore size distributions (each line indicates a different carbon material). Using the proven ability to control the pore size distribution and particle size, a variety of carbons can be used to optimize the efficacy of the devices. AC impedance spectroscopy and carbons with varying pore size distributions may be used to study which pores are effective in the devices during a variety of time constants. The particle size distribution of carbon suspended in electrolyte also drives the efficacy of the electrode material and is optimized in various embodiments as described below. The primary metric used in evaluating carbon for use in the devices is energy stored per dollar of carbon.

Carbon materials for use in the present device include activated and unactivated carbon materials, including carbon cryogels, carbon xerogels and carbon aerogels. In some embodiments, the carbon electrode material comprises a surface area ranging from 1500 $m^2/g$ to 3000 $m^2/g$, and a pore size distribution comprising:

a) pores having a diameter less than 2 nm;
b) pores having a diameter of 3 nm; and
c) pores having a diameter between 7 and 8 nm.

In some other embodiments, the carbon electrode material comprises a peak pore volume greater than 0.1 $cm^3/g$ for pores comprising a diameter less than 2 nm and a peak pore volume greater than 0.1 $cm^3/g$ for pores comprising a diameter ranging from 5 nm to 12 nm.

In some other embodiments, the carbon electrode material is an ultrapure synthetic carbon material comprising a total impurity content of less than 500 ppm of elements having atomic numbers ranging from 11 to 92 as measured by proton induced x-ray emission. The high purity of such carbon materials may increase the electrical performance of the device and/or reduce self discharge of the electrode/electrolyte suspension. In other embodiments, the carbon electrode material comprises less than 200 ppm, less than 100 ppm, less than 50 ppm or even less than 10 ppm of elements having atomic numbers ranging from 11 to 92 as measured by proton induced x-ray emission.

The carbon electrode materials may comprise a high surface area. While not wishing to be bound by theory, it is thought that such high surface area may contribute to the high energy density obtained from devices comprising the carbon electrode material. Accordingly, in some embodiments, the carbon electrode material comprises a BET specific surface area of at least 1000 $m^2/g$, at least 1500 $m^2/g$, at least 2000 $m^2/g$, at least 2400 $m^2/g$, at least 2500 $m^2/g$, at least 2750 $m^2/g$ or at least 3000 $m^2/g$.

In still other embodiments, the carbon electrode material comprises a bi-functional catalyst (e.g., at least 1000 ppm of a bi-functional catalyst). For example, in some embodiments the carbon electrode material comprises at least 1000 ppm of a bi-functional catalyst and a pore structure comprising pores, the pore structure comprising a total pore volume of at least 1 cc/g, wherein at least 50% of the total pore volume resides in pores having a pore size ranging from 2 nm to 50 nm as determined from $N_2$ sorption derived DFT. The bifunctional catalysts (as defined above) are selected to optimize electrochemical performance of the device for the desired application.

In other embodiments, the carbon electrode material comprises an electrochemical modifier (e.g., at least 1,000 ppm of an electrochemical modifier). For example, in some embodiments the carbon electrode material comprises at least 1,000 ppm of an electrochemical modifier, wherein the electrochemical modifier comprises lead, tin, antimony, bismuth, arsenic, tungsten, silver, zinc, cadmium, indium, sulfur, silicon or combinations thereof, and wherein the carbon electrode material comprises a total of less than 500 ppm of all other elements having atomic numbers ranging from 11 to 92, as measured by proton induced x-ray emission. Electrochemical modifiers are selected to enhance the electrochemical performance of the device.

In still other embodiments, the carbon electrode material may comprise a battery electrode material within the same particle. This may allow for an EDLC mechanism to be activated when the particle contacts the current collector which can then charge a battery material within the same particle while the particle is no longer in contact with the current collector. In such a way, the energy storing capability of the particle may be increased by the usage of higher energy density but lower power battery materials.

Accordingly, certain embodiments are directed to devices comprising a carbon electrode material, wherein the carbon electrode material further comprises an electrode material selected from silicon alloys, titania, transition metal oxides, NMC, NMA, $LiCoO_2$, $LiFePO_4$, metal phosphates, $MoS_2$, lithium/aluminum alloys, FeS, sodium, sulfur, a different type of carbon material, zinc, bromine, lithium, magnesium, aluminum, iron, calcium, cadmium, iron oxide, silver oxide, nickel oxide, cadmium hydroxide, zinc oxide, nickel hydroxide, nickel oxyhydroxide, metallic iron, silver oxide, lead and lead oxide.

In still other embodiments, the carbon electrode material comprises a pore structure optimized to enhance the electrochemical performance (e.g., power) of the device. In some embodiments, the carbon electrode material comprises a pore structure, the pore structure comprising micropores, mesopores and a total pore volume, wherein from 40% to 90% of the total pore volume resides in micropores, from 10% to 60% of the total pore volume resides in mesopores and less than 10% of the total pore volume resides in pores greater than 20 nm.

In certain embodiments, the electrode material is in the form of particles. The size of the particles is not particularly limited. For example, in some embodiments the electrode material comprises particles having diameters ranging from about 1 nm to about 100 μm. In other embodiments, the electrode material comprises particles having diameters ranging from about 10 nm to about 100 μm. In other embodiments, the electrode material comprises particles having diameters ranging from about 100 nm to about 100 μm. In some other embodiments, the electrode material comprises particles having diameters ranging from about 1 μm to about 100 μm, for example from about 1 μm to about 20 μm.

The electrolyte may be selected from any electrolyte known in the art or disclosed in U.S. Pat. Nos. 7,723,262 and 7,835,136 and co-pending U.S. application Ser. No. 12/829,282 (U.S. Pub. No. 2011/002086); Ser. No. 13/046,572 (U.S. Pub. No. 2011/0223494); Ser. No. 12/965,709 (U.S. Pub. No. 2011/0159375); Ser. No. 13/336,975 and U.S. Provisional App. No. 61/613,790, which applications were incorporated by reference above. In some embodiments, the electrolyte in the device is capable of suspending carbon particles for long periods of time (greater than the 24 hour requirement for <5% loss). This may require surface chemistry modification of the electrode materials (e.g., carbon) to enable a good interface between the electrode material and electrolyte. The electrolyte conductivity will have a strong impact on power performance during fast discharge events and energy density as the electrolyte can maximize particle charging. The combination of electrolyte and electrode material drives features such as viscosity and charge retention, which have an impact on the device characteristics.

Useful electrolytes for the present invention include solutes (e.g., salts) dissolved in aqueous solvent, salts dissolved in non-aqueous solvents, and ionic liquids. Examples of electrolytes useful in various embodiments of the present invention include, but are not limited to, solvents such as propylene carbonate, ethylene carbonate, butylene carbonate, dimethyl carbonate, methyl ethyl carbonate, diethyl carbonate, sulfolane, methylsulfolane, acetonitrile or mixtures thereof in combination with solutes such as tetralkylammonium salts such as TEA TFB (tetraethylammonium tetrafluoroborate), MTEATFB (methyltriethylammonium tetrafluoroborate), EMITFB (1 ethyl-3-methylimidazolium tetrafluoroborate), tetraethylammonium, triethylammonium based salts or mixtures thereof.

Typical aqueous electrolytes useful in the various embodiments are selected from HCl, NaOH, KOH, $H_2SO_4$, Ni/Caustic and NaCl. Aside from cost, aqueous systems may have advantages over other electrolytes because higher capacitance is often observed, conductivity can be very high, and the system-level cost advantages are substantial. Much of the cost associated with commercial Electric Double Layer Capacitors (EDLCs) is due to their anhydrous nature. Water based systems result in lower operating voltage, but in this case that lower potential may reduce self-discharge. While not practical in systems that require high gravimetric or volumetric performance, an aqueous system is ideal for grid level $/kWh metrics.

In other embodiments, the electrolyte comprises an ionic liquid. A wide variety of ionic liquids are known to one skilled in the art including, but not limited to, imidazolium salts, such as ethylmethylimidazolium hexafluorophosphate (EMIPF6) and 1,2-dimethyl-3-propyl imidazolium [(DMPIX)Im]. See, for example, McEwen et al., "Nonaqueous Electrolytes and Novel Packaging Concepts for Electrochemical Capacitors," The 7th International Seminar on Double Layer Capacitors and Similar Energy Storage Devices, Deerfield Beach, Fla. (Dec. 8-10, 1997), which reference is hereby incorporated by reference in its entirety.

The viscosity of the electrolyte medium can be in the range of 100 cp or less. In additional embodiments, the viscosity of the electrolyte medium can be in the range of 10 cp or less. In yet additional embodiments, the viscosity of electrolyte medium can be about 1 cp or less. In other embodiments, the electrolyte solvent can be thixotropic.

EXAMPLES

Example 1

Static Device

Figure 4:
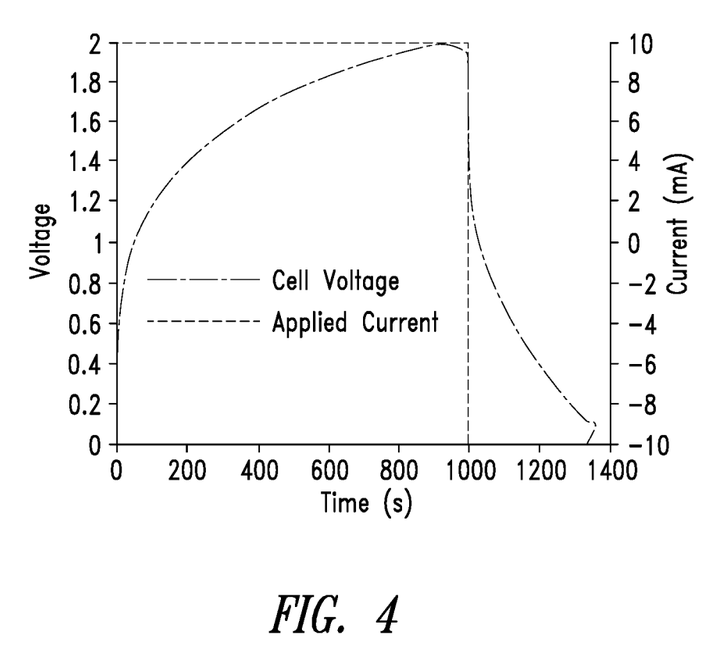
FIG. 4 shows charge/discharge curve showing voltage—state of charge, and current applied in a representative device.

A static device as generally depicted in FIG. 2 was prepared. The device measured approximately 10 cm×10 cm and was about 1.6 mm deep. Electrode material was carbon and the electrolyte was TEA TFB. This device was capable of easily charging and discharging at about 10 mA constant current. A charge/discharge curve for the device is shown in FIG. 4. The observed charge/discharge imbalance is likely due to self-discharge caused by the presence of air, water and/or lack of electrical contact optimization. Such charge imbalance can be corrected by optimization of the parameters described herein.

Example 2

Flow Device

Figure 5:
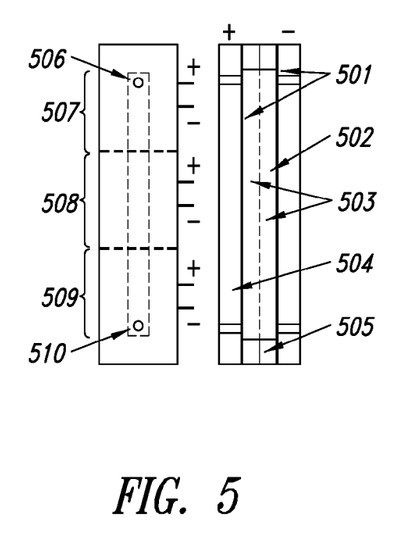
FIG. 5 depicts an exemplary flow device.
Figure 6:
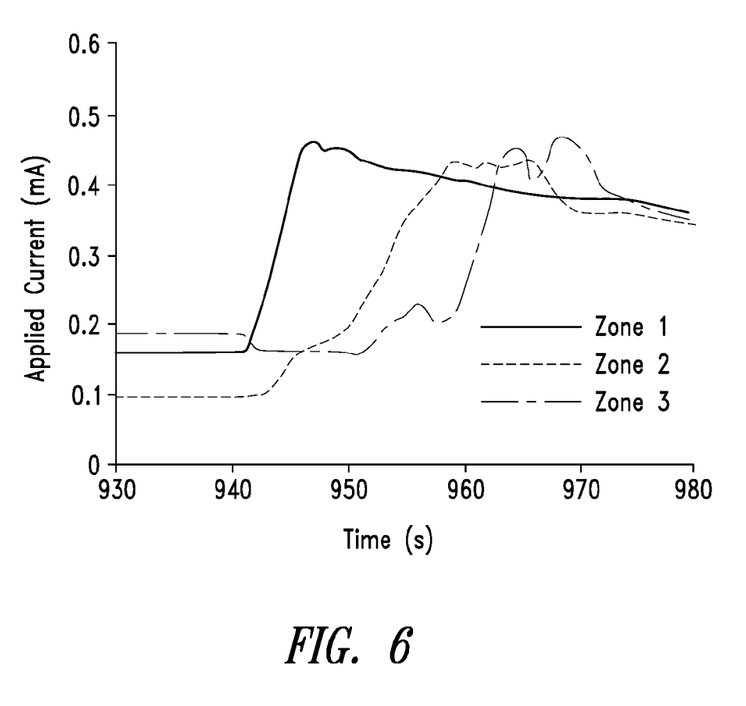
FIG. 6 presents charge current in different zones of an exemplary device.

A flow device was prepared as illustrated in FIG. 5. The device comprised a carbon electrode material, electrolyte (TEA TFB), current collectors 501, an inert porous separator 502, charge channels 503, an outer structure 504 and gaskets 505. Studies conducted with this device indicate that the electrode material becomes charged as it flows through the device. During operation of the device, the electrode suspension moved from an inlet 506 in zone 1 507 through zone 2 508 to an outlet 510 in zone 3 509. Measurements were taken in each zone as the electrode suspension flowed through the electrochemical cell. The voltage was held at 2V with a relatively steady current and electrode flow was initiated at ~940 seconds. FIG. 6 shows that the current requirement of Zone 1 increased immediately with zones 2 and 3 lagging in current accepting capability until fresh—uncharged—electrode material arrived in the respective zones. The charged electrode suspension was captured into charge storage containers upon exiting the electrochemical cell. Even on a bench top in air, an average voltage at ~0.8V across the two charge storage containers was observed. The results indicate that that charge can be stored in the charge storage tanks outside the cell for future use.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrochemical energy storage device, comprising:
    (a) anode and cathode electrode material consisting essentially of activated carbon having a BET specific surface area of at least 1000 $m^2/g$ and optionally silicon;
    (b) electrolyte;
    (c) an electrochemical cell;
    (d) an anode electrode material storage tank and a cathode electrode material storage tank, each in fluid connection with the electrochemical cell; and
    (e) first and second charge storage tanks in fluid connection with the electrochemical cell,
    wherein the anode and cathode electrode material is suspended in the electrolyte, and wherein the electrochemical energy storage device is configured to allow the suspended anode and cathode electrode material to flow from the anode and cathode electrode material storage tanks, respectively, through the electrochemical cell to the first and second charge storage tanks, respectively, in the presence of a voltage applied to the electrochemical cell.

2. The electrochemical energy storage device of claim 1, wherein the anode and cathode electrode materials are each different carbon materials.

3. The electrochemical energy storage device of claim 1, wherein the carbon has a total impurity content of less than 500 ppm of elements having atomic numbers ranging from 11 to 92 as measured by proton induced x-ray emission.

4. The electrochemical energy storage device of claim 1, wherein the carbon comprises micropores, mesopores and a total pore volume, wherein from 40% to 90% of the total pore volume resides in micropores, from 10% to 60% of the total pore volume resides in mesopores and less than 10% of the total pore volume resides in pores greater than 20 nm.

5. The electrochemical energy storage device of claim 1, wherein the carbon comprises particles having an average diameter ranging from 1 μm to 20 μm.

6. The electrochemical energy storage device of claim 1, wherein the electrochemical cell comprises a positive current collector and a negative current collector.

7. The electrochemical energy storage device of claim 1, wherein the electrochemical cell comprises an inert porous separator interposed between a positive current collector and a negative current collector.

8. The electrochemical energy storage device of claim 1, wherein the dimensions of the electrochemical cell are sized to enable laminar flow of a first lamella containing a suspension of positively charged electrode material and electrolyte and a second lamella comprising a suspension of negatively charged electrode material and electrolyte, wherein the first and second lamellae flow in contact with one another without substantial mixing of the two lamellae.

9. The electrochemical energy storage device of claim 1, wherein the electrochemical energy storage device comprises a plurality of electrochemical cells.

10. The electrochemical energy storage device of claim 1, wherein the electrical energy storage device further comprises an outer structure which is electrically insulating.

11. The electrochemical energy storage device of claim 1, wherein the electrolyte comprises a solute dissolved in an aqueous solvent.

12. The electrochemical energy storage device of claim 1, wherein the electrolyte comprises a solute dissolved in a non-aqueous solvent.

13. The electrochemical energy storage device of claim 1, wherein the electrolyte comprises an ionic liquid.

14. The electrochemical energy storage device of claim 1, wherein the electrode material consists essentially of activated carbon having a BET specific surface area of at least 1000 $m^2/g$ and silicon.

15. The electrochemical energy storage device of claim 1, wherein the electrolyte comprises a viscosity of 100 cp or less.

16. The electrochemical energy storage device of claim 1, wherein the electrolyte comprises a solvent having thixotropic properties.

17. The electrochemical energy storage device of claim 1, wherein the activated carbon has a BET specific surface area of at least 1500 $m^2/g$.

18. The electrochemical energy storage device of claim 14, wherein the electrode material comprises particles, the particles comprising carbon and silicon within the same particle.

* * * * *